United States Patent
Kim et al.

(10) Patent No.: US 9,713,143 B2
(45) Date of Patent: Jul. 18, 2017

(54) METHOD AND APPARATUS FOR ESTIMATING SELF-INTERFERENCE IN WIRELESS ACCESS SYSTEM SUPPORTING FULL-DUPLEX RADIO COMMUNICATION

(71) Applicant: LG ELECTRONICS INC., Seoul (KR)

(72) Inventors: Jinmin Kim, Seoul (KR); Kwangseok Noh, Seoul (KR); Kukheon Choi, Seoul (KR); Jaehoon Chung, Seoul (KR); Kitae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 14 days.

(21) Appl. No.: 14/899,498

(22) PCT Filed: Jun. 23, 2014

(86) PCT No.: PCT/KR2014/005516
§ 371 (c)(1),
(2) Date: Dec. 17, 2015

(87) PCT Pub. No.: WO2014/208953
PCT Pub. Date: Dec. 31, 2014

(65) Prior Publication Data
US 2016/0143013 A1    May 19, 2016

Related U.S. Application Data

(60) Provisional application No. 61/838,885, filed on Jun. 25, 2013.

(51) Int. Cl.
*H04W 72/04*   (2009.01)
*H04B 17/345*  (2015.01)
*H04L 27/26*   (2006.01)

(52) U.S. Cl.
CPC ........ *H04W 72/044* (2013.01); *H04B 17/345* (2015.01); *H04L 27/2607* (2013.01)

(58) Field of Classification Search
CPC ... H04L 5/0048; H04L 5/0051; H04B 17/309; H04B 17/345
See application file for complete search history.

(56) References Cited

U.S. PATENT DOCUMENTS

2007/0217327 A1* 9/2007 Baggen ............. H04L 25/03159
                                                         370/208
2010/0271932 A1 10/2010 Hwang et al.
(Continued)

FOREIGN PATENT DOCUMENTS

CN    101027850    8/2007
CN    101212442    7/2008
(Continued)

OTHER PUBLICATIONS

PCT International Application No. PCT/KR2014/005516, Written Opinion of the International Searching Authority dated Sep. 26, 2014, 18 pages.
European Patent Office Application Serial No. 148187313, Search Report dated Dec. 19, 2016, 7 pages.

*Primary Examiner* — Scott M Sciacca
(74) *Attorney, Agent, or Firm* — Lee, Hong, Degerman, Kang & Waimey PC

(57) ABSTRACT

The present invention provides methods for estimating self-interference in a full-duplex radio (FDR) system using a reference signal to which a cyclic shift is applied, and apparatuses supporting the same. According to one embodiment of the present invention, a method for estimating a self-interference (SI) channel, by a base station, in a wireless access system supporting wireless FDR communication comprises the steps of: transmitting a channel signal including a first cyclic shift variable allocated to a terminal; transmitting a downlink (DL) self-interference reference
(Continued)

signal (SI-RS) for estimating the SI channel generated on the basis of a second cyclic shift variable; receiving the DL SI-RS; receiving an uplink (UL) SI-RS generated on the basis of the first cyclic shift variable; and estimating the SI channel using the DL SI-RS and the UL SI-RS.

15 Claims, 19 Drawing Sheets

(56) References Cited

U.S. PATENT DOCUMENTS

| | | |
|---|---|---|
| 2011/0143655 A1 | 6/2011 | Ahn et al. |
| 2012/0106405 A1 | 5/2012 | Lioliou et al. |
| 2012/0155335 A1 | 6/2012 | Khojastepour et al. |
| 2013/0136085 A1 | 5/2013 | Ogawa et al. |
| 2014/0016515 A1* | 1/2014 | Jana ........................ H04L 5/143 370/278 |
| 2015/0295698 A1* | 10/2015 | Zhang ...................... H04L 5/00 370/281 |

FOREIGN PATENT DOCUMENTS

| | | |
|---|---|---|
| CN | 101228756 | 7/2008 |
| CN | 102859893 | 1/2013 |
| KR | 10-2012-0095577 | 8/2012 |
| WO | 2012/166619 | 12/2012 |

* cited by examiner

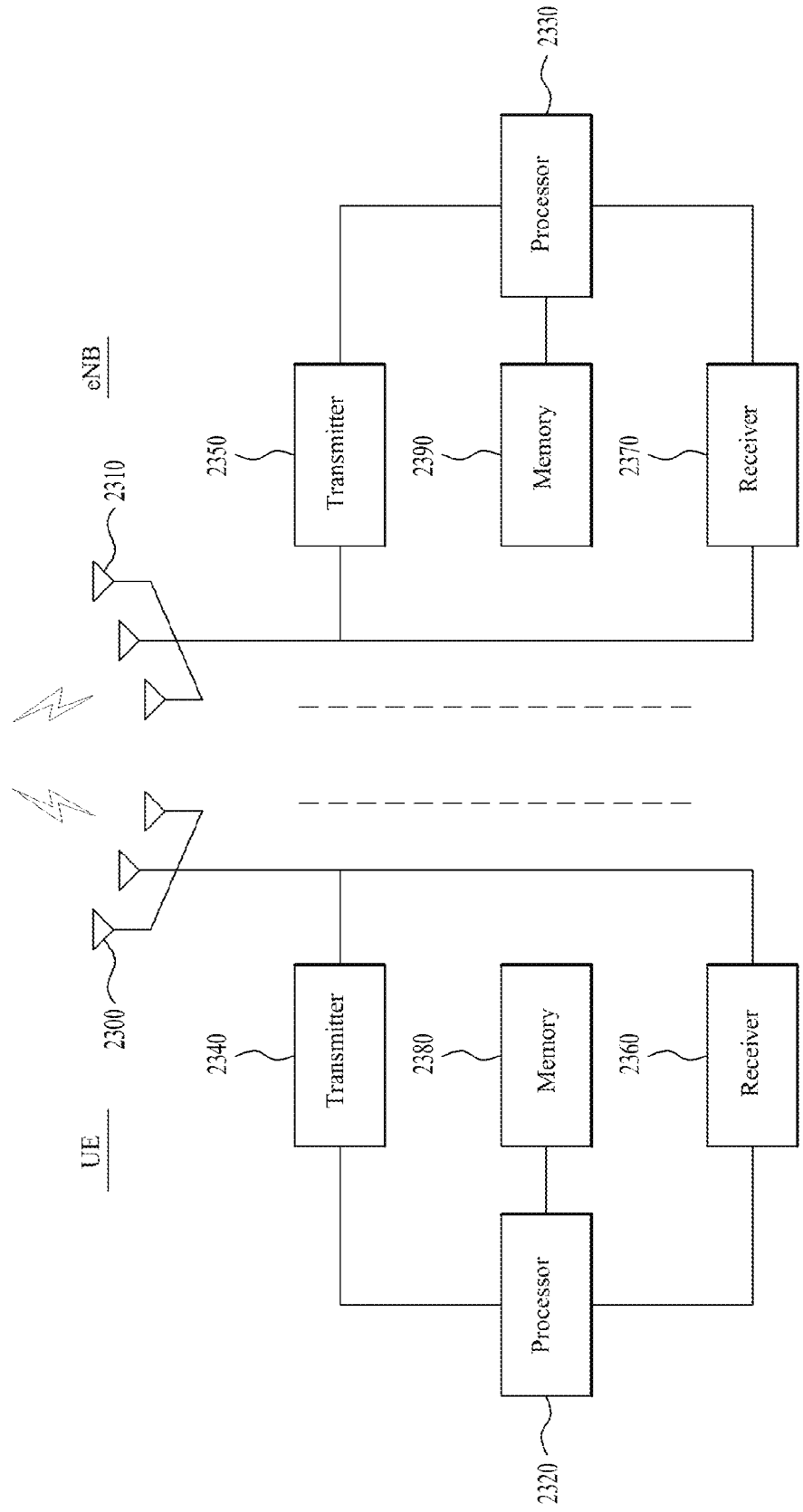

METHOD AND APPARATUS FOR ESTIMATING SELF-INTERFERENCE IN WIRELESS ACCESS SYSTEM SUPPORTING FULL-DUPLEX RADIO COMMUNICATION

CROSS-REFERENCE TO RELATED APPLICATIONS

This application is the National Stage filing under 35 U.S.C. 371 of International Application No. PCT/KR2014/005516, filed on Jun. 23, 2014, which claims the benefit of U.S. Provisional Application No. 61/838,885, filed on Jun. 25, 2013, the contents of which are all hereby incorporated by reference herein in their entirety.

TECHNICAL FIELD

The present invention relates to methods for measuring self-interference using a reference signal to which a cyclic shift is applied in a full duplex radio (FDR) system as a wireless access system, and apparatuses supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

That is, in legacy wireless access systems, a Base Station (BS) or a UE performs communication using a Half Duplex Radio (HDR) scheme of a Frequency Division Duplex (FDD) scheme for transmitting signals on a wireless resource divided based on frequency or a Time Division Duplex (TDD) scheme for transmitting signals on a wireless resource divided based on time.

However, in the HDR communication scheme, the UE and/or the BS are incapable of simultaneously performing reception and transmission in the same frequency/time resource. Therefore, introduction of an FDR communication scheme has been proposed to efficiently use resources. The FDR communication scheme refers to a scheme in which the BS and/or the UE simultaneously transmit and receive different signals in the same frequency/time resource zone.

Notably, since the BS and/or the UE simultaneously perform data transmission and reception through the same resource zone in a communication environment of the FDR scheme, self-interference in which a signal transmitted by the BS or the UE is received through a reception antenna of the BS or the UE occurs. In addition, mutual interference may occur when both an FDR zone and an HDR zone are configured together.

Accordingly, the methods for measuring self-interference channels are needed to reduce self-interference in a wireless access system supporting FDR scheme.

DISCLOSURE

Technical Problem

An object of the present invention is to provide methods for efficient communication.

Another object of the present invention is to provide methods for estimating a radio channel in order to cancel self-interference in an FDR system.

Still another object of the present invention is to provide methods for generating a new reference signal used in the FDR system for channel estimation.

Yet another object of the present invention is to provide apparatuses for supporting the methods.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The present invention provides methods for measuring self-interference using a reference signal to which a cyclic shift is applied in an FDR system and apparatuses for supporting the same.

According to one aspect of the present invention, a method for estimating, by an eNB, a self-interference (SI) channel in a wireless access system supporting full duplex radio (FDR) communication includes steps of: transmitting a channel signal including a first cyclic shift variable allocated to a UE; transmitting a downlink (DL) self-interference reference signal (SI-RS) for estimating the SI channel, generated on the basis of a second cyclic shift variable; receiving the DL SI-RS; receiving an uplink (UL) SI-RS generated on the basis of the first cyclic shift variable; and estimating the SI channel using the DL SI-RS and the UL SI-RS.

According to another aspect of the present invention, an eNB for estimating an SI channel in a wireless access system supporting FDR communication includes: a transmitter; a receiver; and a processor configured to estimate in connection with the transmitter and the receiver. The processor is configured: to control the transmitter to transmit a channel signal including a first cyclic shift variable allocated to a UE and to transmit a DL SI-RS for estimating the SI channel, generated on the basis of a second cyclic shift variable; to control the receiver to receive the DL SI-RS and to receive a UL SI-RS generated on the basis of the first cyclic shift variable; and to estimate the SI channel using the DL SI-RS and the UL SI-RS.

According to another aspect of the present invention, a method for estimating, by a UE, an SI channel in a wireless access system supporting FDR communication includes steps of: receiving a channel signal including a first cyclic shift variable allocated to the UE; transmitting a UL SI-RS generated on the basis of the first cyclic shift variable; receiving the UL SI-RS; receiving a DL SI-RS generated on the basis of a second cyclic shift variable; and estimating the SI channel using the DL SI-RS and the UL SI-RS.

According to another aspect of the present invention, a UE for estimating an SI channel in a wireless access system supporting FDR communication includes: a transmitter; a receiver; and a processor configured to estimate in connection with the transmitter and the receiver. The processor is configured to control the transmitter and the receiver to receive a channel signal including a first cyclic shift variable allocated to the UE, to transmit a UL SI-RS generated on the basis of the first cyclic shift variable, to receive the UL SI-RS, to receive a DL SI-RS generated on the basis of a second cyclic shift variable and to estimate the SI channel using the DL SI-RS and the UL SI-RS.

The second cyclic shift variable may be a fixed value in the system, and the first cyclic shift variable may be a value per UE.

The DL SI-RS and the UL SI-RS may be transmitted through the same resource region in a specific subframe.

The DL SI-RS and the UL SI-RS may be transmitted through different resource regions in a specific subframe.

Estimation of the SI channel may be performed in consideration of one or more of a total number of cyclic shift variables, the first cyclic shift variable and the second cyclic shift variable.

The afore-described aspects of the present invention are merely a part of preferred embodiments of the present invention. Those skilled in the art will derive and understand various embodiments reflecting the technical features of the present invention from the following detailed description of the present invention.

Advantageous Effects

According to the embodiments of the present invention, the following effects can be achieved.

Firstly, efficient communication can be performed in a wireless access system supporting FDR communication.

Secondly, self-interference, which is a serious problem in an FDR system, can be cancelled.

Thirdly, resource waste can be restricted and an SI channel can be efficiently estimated by arranging SI-RSs in a subframe as in the present invention.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention. In the drawings:

FIG. 23 illustrates an apparatus for implementing the methods illustrated in FIGS. 1 to 22.

BEST MODE

Figure 1:
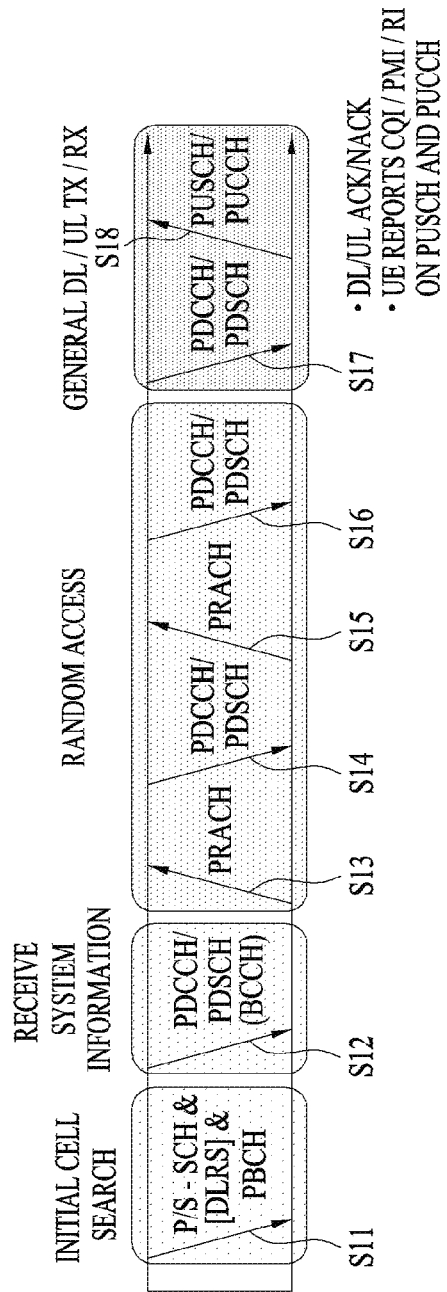
FIG. 1 illustrates physical channels and a general signal transmission method using the physical channels, which may be used in embodiments of the present invention.

The present invention described below in detail defines a structure of an FDR region in a full duplex radio (FDR) system as a wireless access system. In addition, the present invention provides methods and apparatuses for transmitting allocation information about a configured FDR region.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

In the embodiments of the present invention, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present invention, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DL.

The embodiments of the present invention may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present invention may be supported by the standard specifications, 3GPP TS 36.211, 3GPP TS 36.212, 3GPP TS 36.213, and 3GPP TS 36.321. That is, the steps or parts, which are not described to clearly reveal the technical idea of the present invention, in the embodiments of the present invention may be explained by the above standard specifications. All terms used in the embodiments of the present invention may be explained by the standard specifications.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific terms in order to provide a thorough understanding of the present invention. However, it will be apparent to those skilled in the art that the specific terms may be replaced with other terms without departing the technical spirit and scope of the present invention.

For example, the term used in embodiments of the present invention, 'synchronization signal' is interchangeable with a synchronization sequence, a training symbol or a synchronization preamble in the same meaning.

The embodiments of the present invention can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present invention are described in the context of a 3GPP LTE/LTE-A system in order to clarify the technical features of the present invention, the present invention is also applicable to an IEEE 802.16e/m system, etc.

1.3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present invention.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
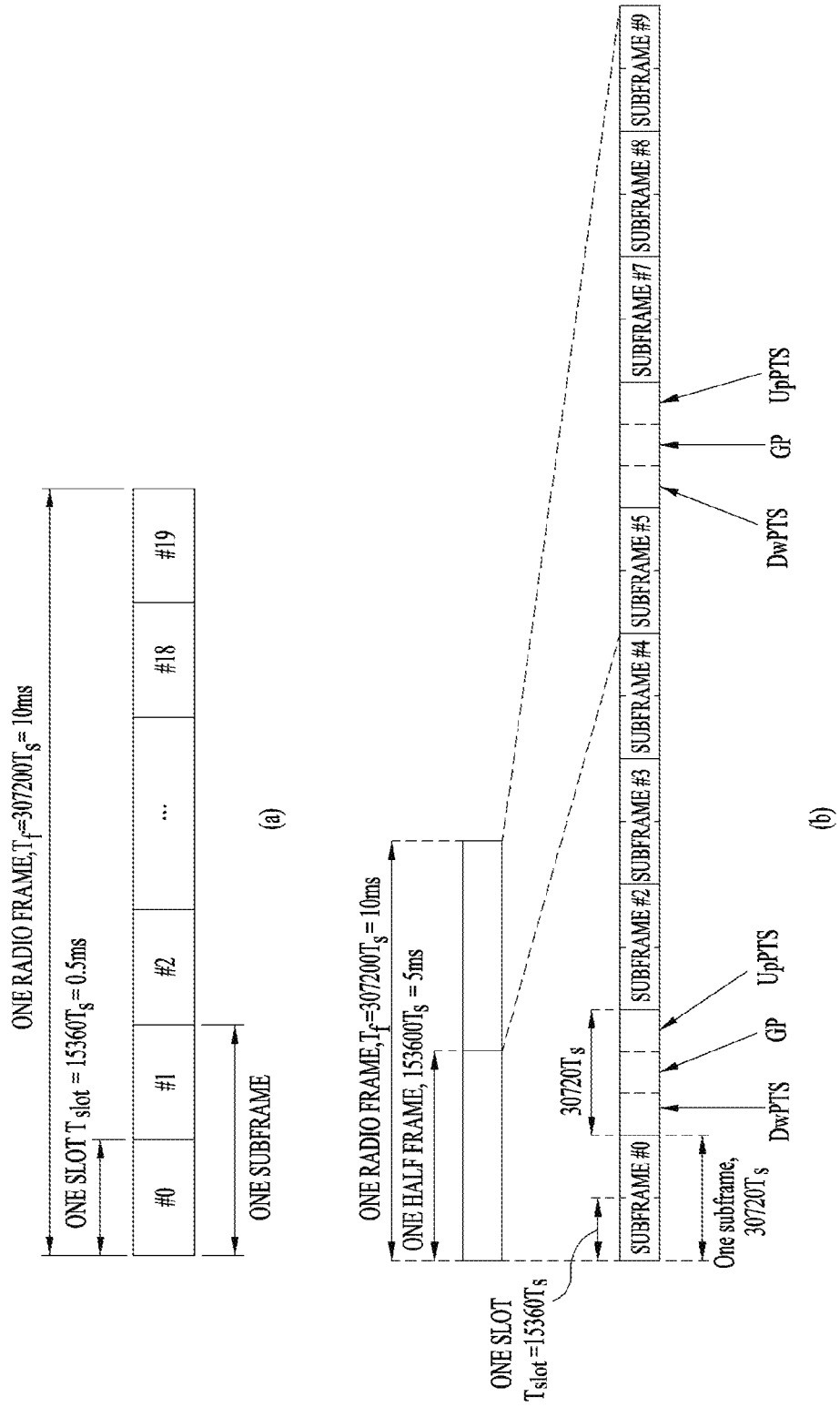
FIG. 2 illustrates radio frame structures used in embodiments of the present invention.

FIG. 2 illustrates exemplary radio frame structures used in embodiments of the present invention.

FIG. 2(a) illustrates frame structure type 1. Frame structure type 1 is applicable to both a full Frequency Division Duplex (FDD) system and a half FDD system.

One radio frame is 10 ms ($T_f$=307200·$T_s$) long, including equal-sized 20 slots indexed from 0 to 19. Each slot is 0.5 ms ($T_{slot}$=15360·$T_s$) long. One subframe includes two successive slots. An $i^{th}$ subframe includes $2i^{th}$ and $(2i+1)^{th}$ slots. That is, a radio frame includes 10 subframes. A time required for transmitting one subframe is defined as a Transmission Time Interval (TTI). Ts is a sampling time given as $T_s$=1/(15 kHz×2048)=3.2552×10$^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f$=307200·$T_s$) long, including two half-frames each having a length of 5 ms (=153600·$T_s$) long. Each half-frame includes five subframes each being 1 ms (=30720·$T_s$) long. An $i^{th}$ subframe includes $2i^{th}$ and $(2i+1)^{th}$ slots each having a length of 0.5 ms ($T_{slot}$=15360·$T_s$). $T_s$ is a sampling time given as $T_s$=1/(15 kHz×2048)=3.2552×10$^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

Table [1] below lists special subframe configurations (DwPTS/GP/UpPTS lengths).

TABLE 1

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 3:
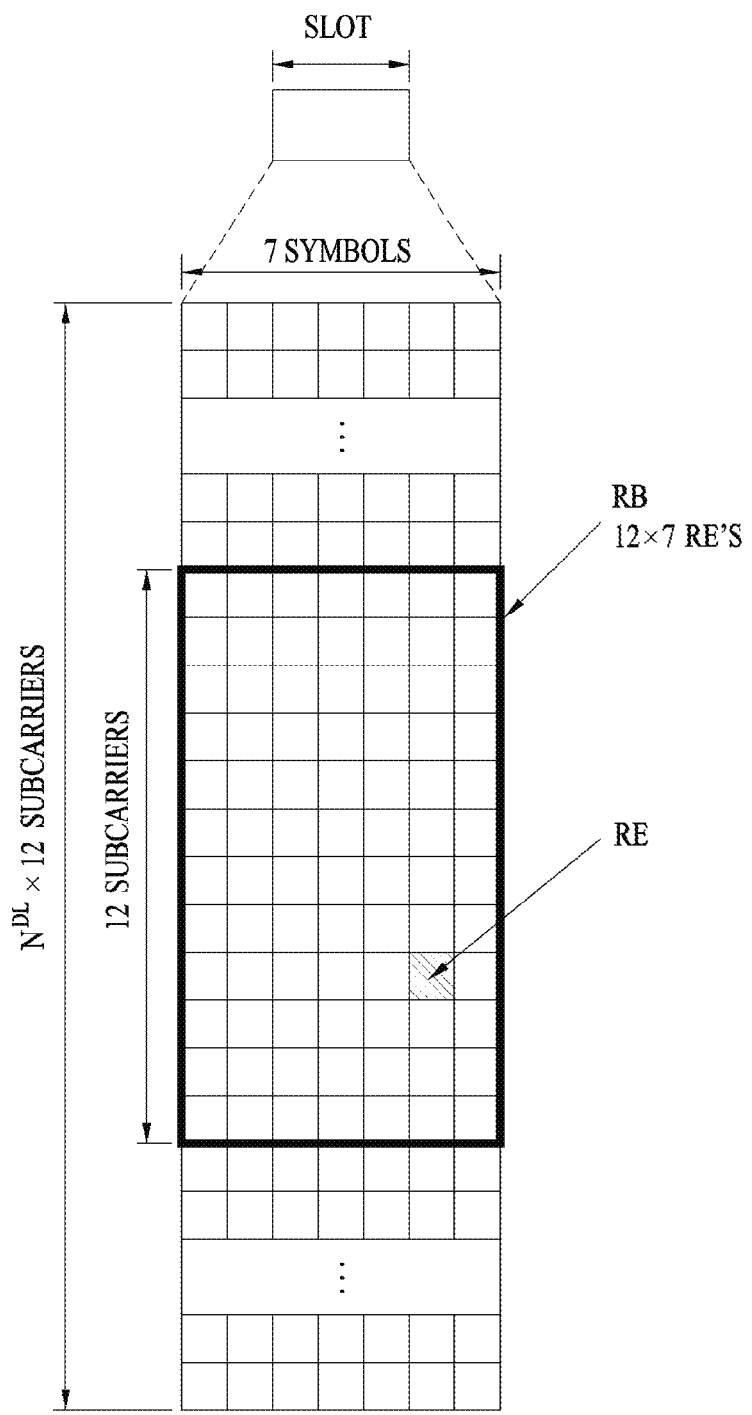
FIG. 3 illustrates a structure of a DownLink (DL) resource grid for the duration of one DL slot, which may be used in embodiments of the present invention.

FIG. 3 illustrates an exemplary structure of a DL resource grid for the duration of one DL slot, which may be used in embodiments of the present invention.

Referring to FIG. 3, a DL slot includes a plurality of OFDM symbols in the time domain. One DL slot includes 7 OFDM symbols in the time domain and an RB includes 12 subcarriers in the frequency domain, to which the present invention is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
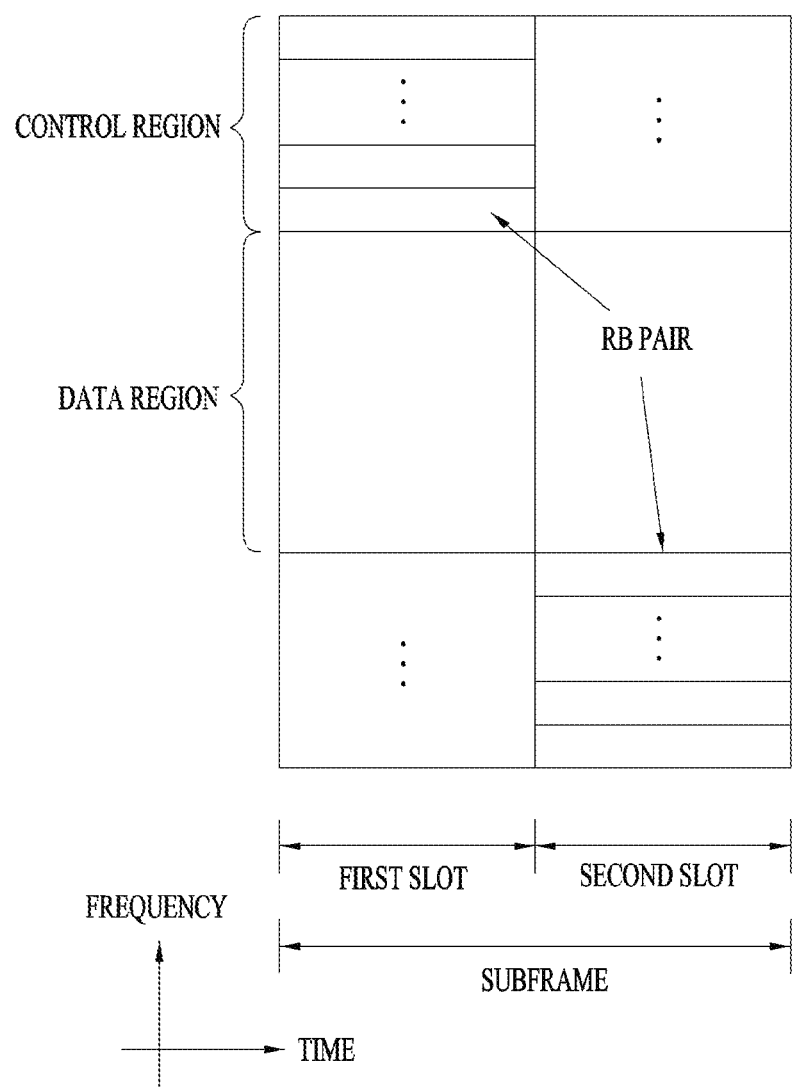
FIG. 4 illustrates a structure of an UpLink (UL) subframe, which may be used in embodiments of the present invention.

FIG. 4 illustrates a structure of a UL subframe which may be used in embodiments of the present invention.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
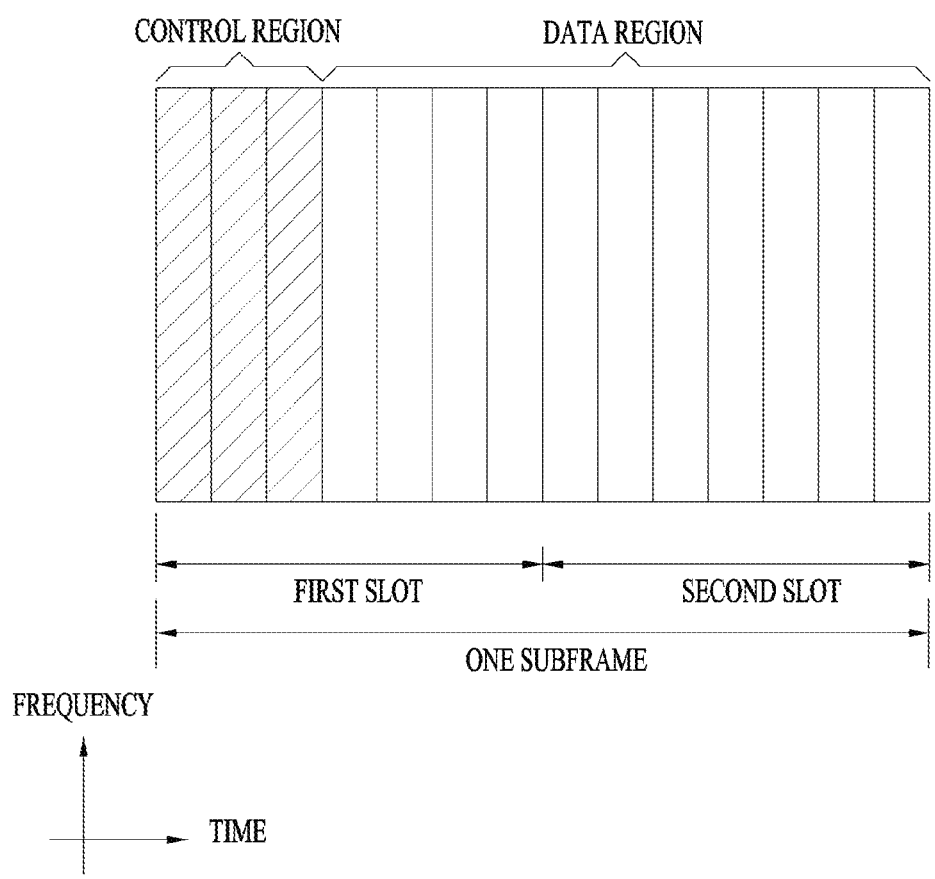
FIG. 5 illustrates a structure of a DL subframe, which may be used in embodiments of the present invention.

FIG. 5 illustrates a structure of a DL subframe that may be used in embodiments of the present invention.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. Carrier Aggregation (CA) Environment 2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present invention, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation.

The term CA is interchangeable with carrier combining, bandwidth aggregation, spectrum aggregation, etc. The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present invention may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present invention.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set is preferably defined within the UE DL CC set. That is, the eNB transmits a PDCCH only in the PDCCH monitoring set to schedule a PDSCH or PUSCH for the UE.

Figure 6:
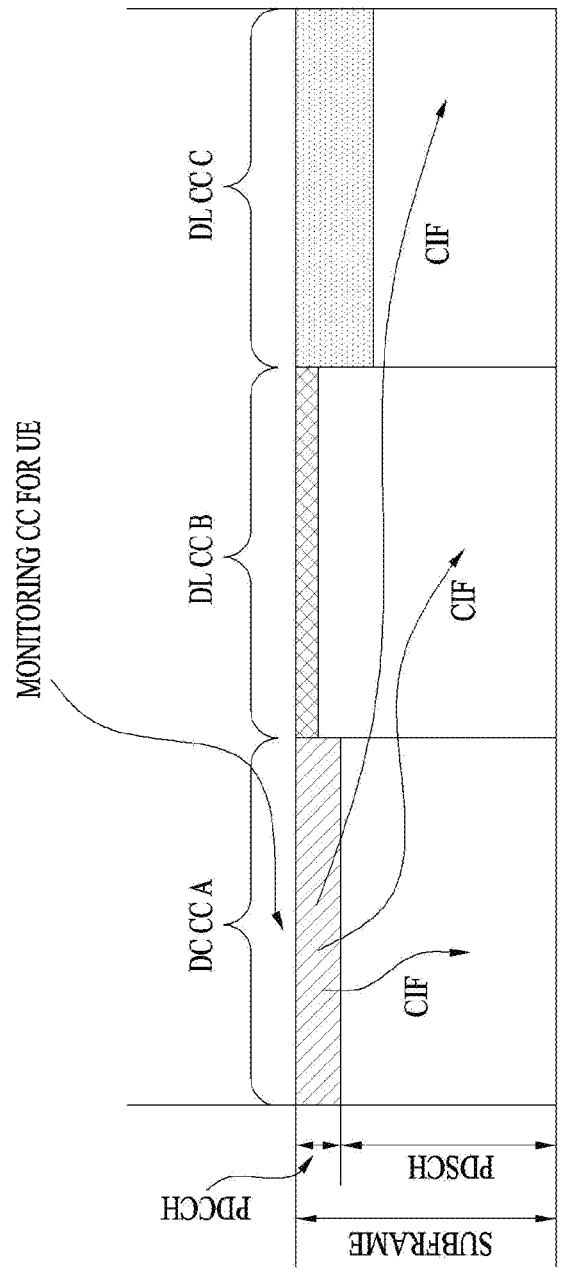
FIG. 6 illustrates a cross carrier-scheduled subframe structure in the LTE-A system, which is used in embodiments of the present invention.

FIG. 6 illustrates a cross carrier-scheduled subframe structure in the LTE-A system, which is used in embodiments of the present invention.

Referring to FIG. 6, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

3. FDR System

An FDR system is applicable to the above-described LTE/LTE-A system. That is, all of a frame structure, a control signal transmission and reception method, and support of a CA scheme, defined in the LTE/LTE-A system, may be applied to the FDR system. Hereinafter, an interference cancellation method specific to the FDR system will be described in more detail.

3.1 Interference Cancellation in FDR System

FDR refers to a system that simultaneously supports data transmission and reception using the same resource (i.e., the same time and the same frequency) in one UE. FDR may be a new type of wireless access system. However, in embodiments of the present invention, it is assumed that the FDR system operates based on the LTE/LTE-A system as described in FIGS. 1 to 6.

Figure 7:
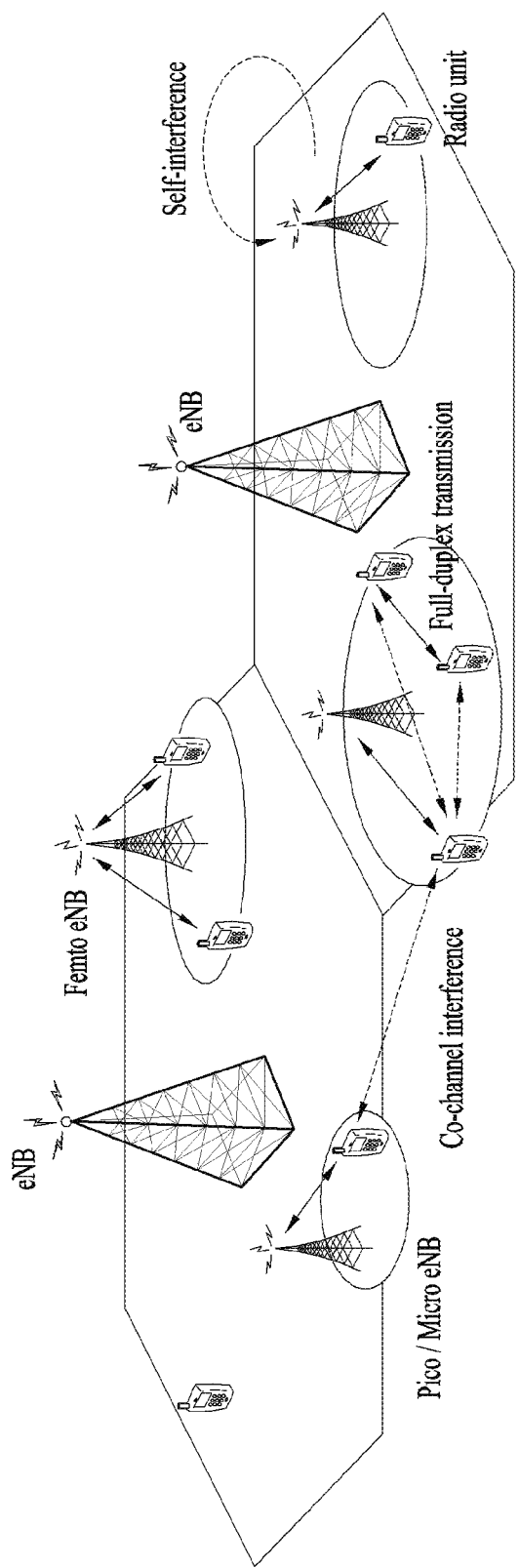
FIG. 7 is a diagram illustrating deployment of an exemplary wireless access system supporting FDR.

FIG. 7 is a diagram illustrating deployment of an exemplary wireless access system supporting FDR.

Referring to FIG. 7, a wireless access system supporting FDR includes a macro eNB managing a normal cell, a small eNB managing a small cell, and a UE (i.e., a wireless unit). The small eNB includes a micro eNB, a femto eNB, a pico eNB, and the like.

In a situation as illustrated in FIG. 7, there may be three types of interference described below.

(1) Intra-Device Interference (IDI)

IDI indicates that a signal transmitted from a transmission antenna of an eNB or a UE is received by a reception antenna, thereby acting as interference due to characteristics of FDR. A signal transmitted from a transmission antenna of a specific device has higher power than a received signal. That is, since a signal transmitted by a transmission antenna of a specific device is received by a reception antenna of the specific device almost without attenuation due to a short distance between the transmission antenna and the reception antenna, the signal transmitted from the transmission antenna of the specific device is received at much higher power than a desired signal that the specific device expects to receive from a peer device.

(2) UE-to-UE Inter-link Interference

UE-to-UE inter-link interference indicates that a UL signal transmitted by a specific UE is received by another UE adjacent to the specific UE, thereby acting as interference.

(3) BS-to-BS Inter-link Interference

BS-to-BS inter-link interference indicates that a signal transmitted between eNBs or between heterogeneous eNBs in a Heterogeneous Network (HetNet) situation is received by a reception antenna of another eNB, thereby acting as interference.

From among the above three types of interference, IDI (hereinafter, self-interference) is affected by interference generated only in FDR and should be solved first for FDR management.

Figure 8:
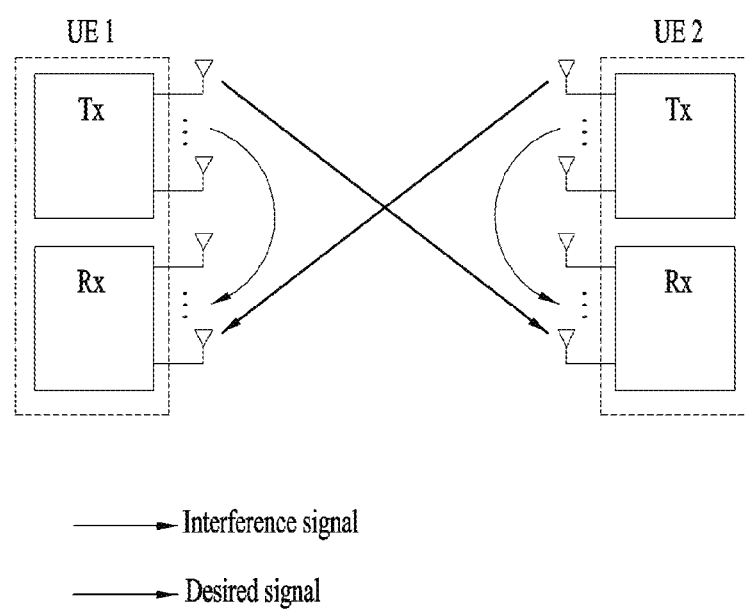
FIG. 8 is a diagram illustrating the concept of self-interference occurring in an FDR system.

FIG. 8 is a diagram illustrating the concept of self-interference occurring in an FDR system.

Although FIG. 8 shows data communication performed between UEs for convenience of description, the present invention is identically applicable to data communication performed between a UE and an eNB.

Referring to FIG. 8, in an FDR environment, a transmission signal transmitted by a transmission antenna of a first UE (i.e., UE1) to a second UE (i.e., UE2) is received by a reception antenna of the first UE, thereby acting as an interference signal. Such self-interference has unique characteristics as opposed to other interference.

First, the first UE may regard a signal causing interference as a perfectly known signal because a self-interference signal received through the reception antenna of the first UE is the transmission signal transmitted by the first UE.

Second, power of the interference signal is remarkably higher than power of a desired signal that the first UE desires to receive because a distance between the transmission antenna and the reception antenna of the first UE is much narrower than a distance between the first UE and the second UE. Due to these characteristics, a receiver is unable to perfectly cancel the interference signal even though a UE is fully aware of the interference signal.

A receiver of a UE may use an Analog-to-Digital Converter (ADC) to convert a received signal into a digital signal. Generally, the ADC measures power of the received signal to adjust a power level of the received signal, quantizes the received signal, and converts the received signal into a digital signal. However, since an interference signal is received by the receiver at a remarkably higher power relative to a desired signal, characteristics of a desired signal are all covered by a quantization level during quantization and thus the receiver may be unable to restore the received signal.

Figure 9:
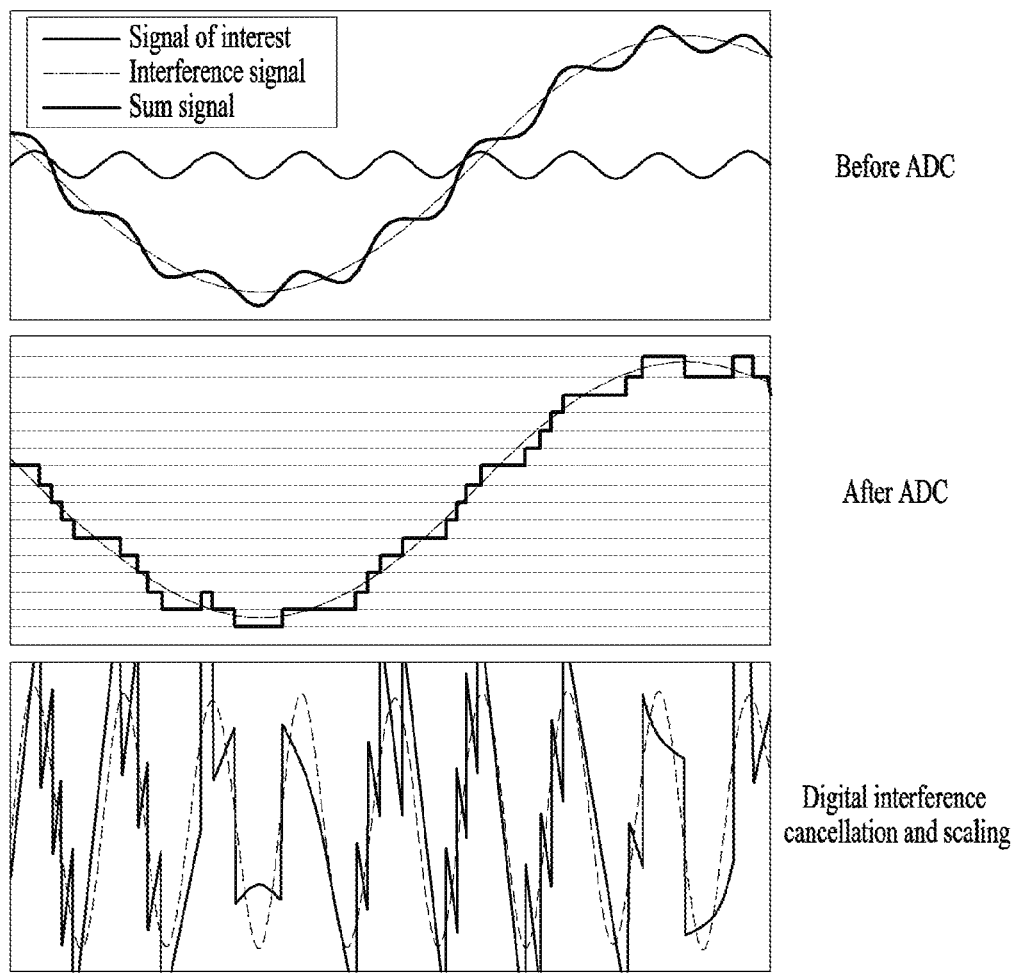
FIG. 9 is a diagram illustrating signal distortion caused by a quantization error when power of an interference signal is higher than power of a desired signal.
Figure 10:
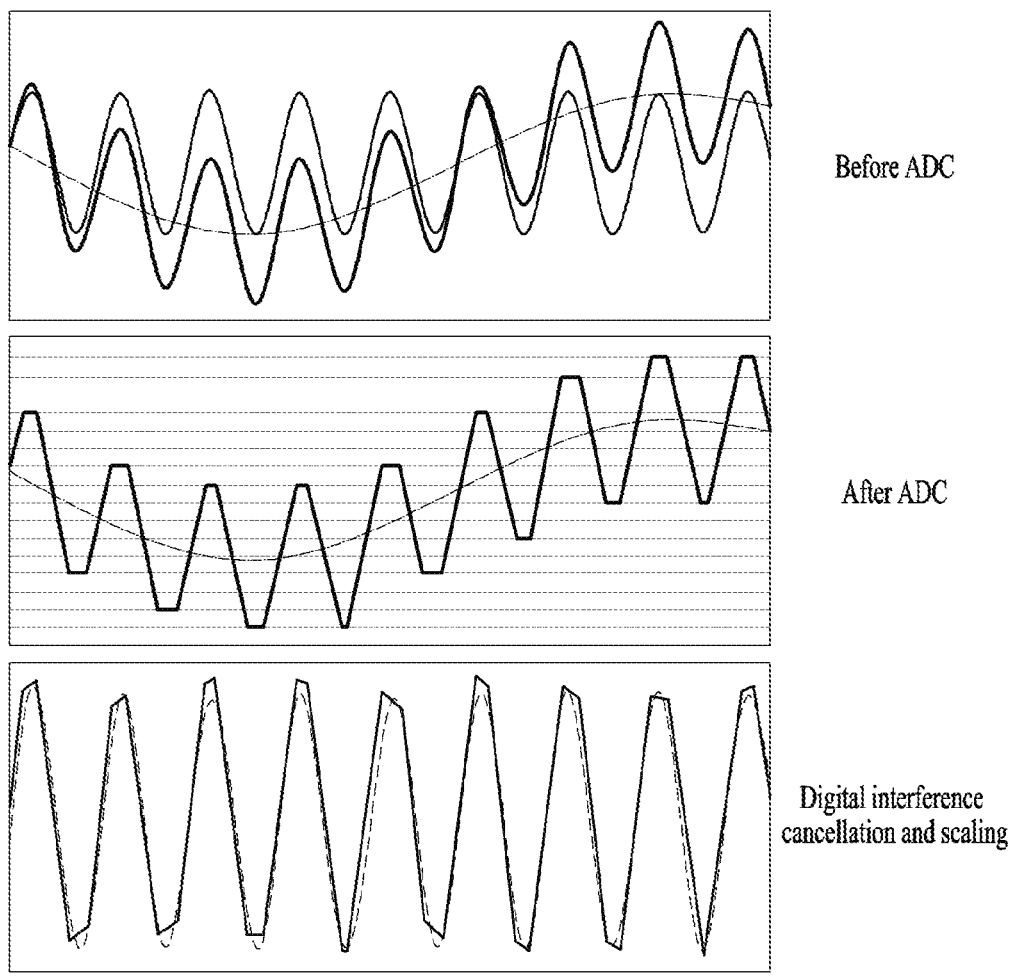
FIG. 10 is a diagram illustrating a signal restoration state when power of an interference signal is lower than power of a desired signal.

FIG. 9 is a diagram illustrating signal distortion caused by a quantization error when power of an interference signal is higher than power of a desired signal and FIG. 10 is a diagram illustrating a signal restoration state when power of an interference signal is lower than power of a desired signal.

As can be seen from FIG. 9, a desired signal is severely distorted even when an interference signal is eliminated in a situation in which the interference signal has remarkably higher power than the desired signal on the assumption that 4-bit quantization is performed. In contrast, FIG. 10 shows that a desired signal is restored after an interference signal is eliminated when the interference signal has lower power than the desired signal.

Figure 11:
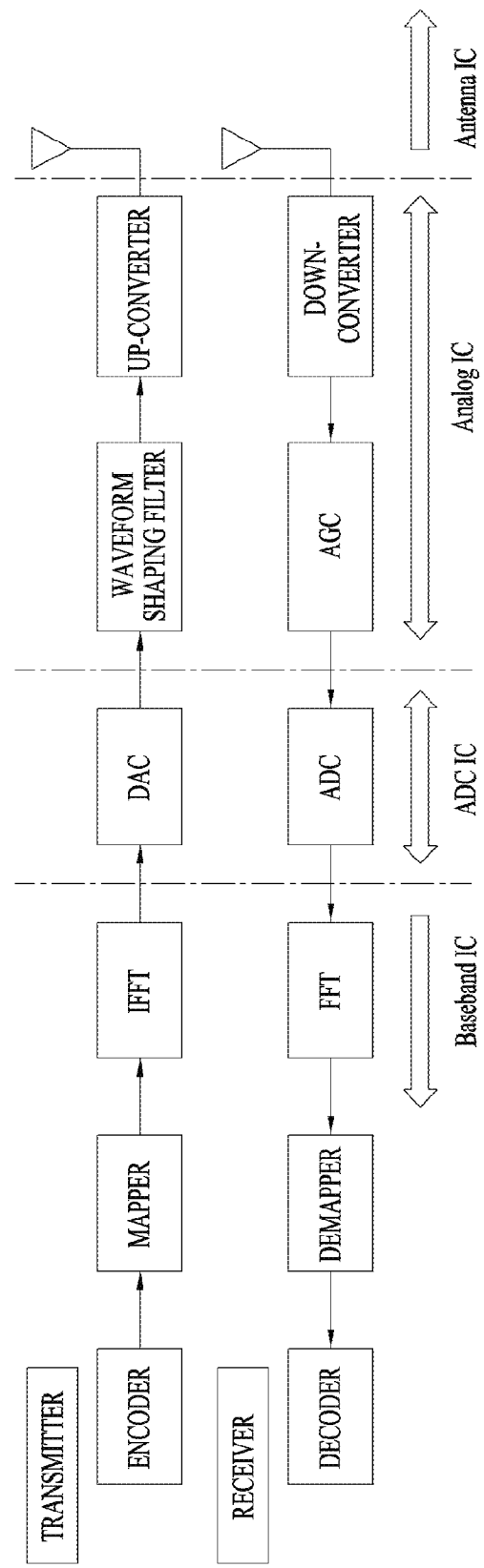
FIG. 11 is a block diagram of a transmitter and a receiver to which schemes for cancelling self-interference are applied.

FIG. 11 is a block diagram of a transmitter and a receiver to which schemes for cancelling self-interference are applied.

Referring to FIG. 11, the transmitter may include an encoder for encoding a data bit, a mapper for mapping the encoded data bit to a physical resource, an Inverse Fast Fourier Transform (IFFT) unit for modulating the data bit to data using an OFDM scheme, a Digital-to Analog Converter (DAC) for modulating a digital signal into an analog signal, a waveform shaping filter for converting the modulated signal into a desired waveform, an up-converter for raising frequency of a signal, and an antenna.

The receiver may include an antenna for receiving a signal, a down converter for lowering a frequency of the received signal, an Automatic Gain Controller (AGC) for automatically controlling an amplification factor so that output of a circuit becomes a predetermined range, an Analog-to-Digital Converter (ADC) for modulating an analog signal into a digital signal, a Fast Fourier Transform (FFT) unit for converting an input signal into data of a frequency domain, a demapper and a decoder for decoding an output signal.

Referring to FIG. 11, antenna Interference Cancellation (IC) is performed in the antennas of the transmitter and the receiver and analog IC is performed in the waveform shaping filter and the up-converter of the transmitter and the AGC and the down-converter of the receiver. ADC IC is performed in the DAC of the transmitter and the ADC of the receiver and baseband IC (or digital IC) is performed in the other parts of the transmitter and the receiver.

Hereinafter, IC schemes performed by each part of the transmitter and the receiver will be described.

3.1.1 Antenna IC

Figure 12:
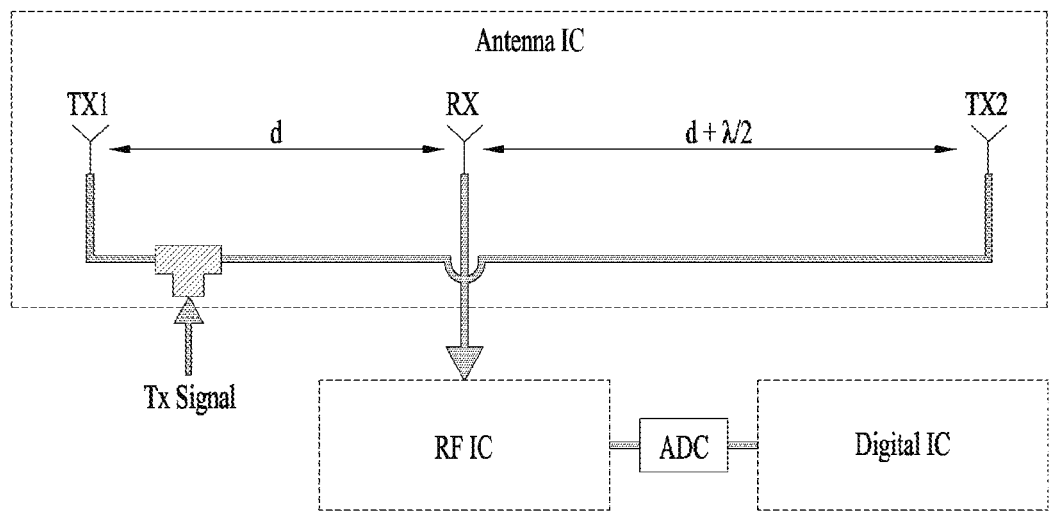
FIG. 12 is a diagram illustrating an exemplary antenna IC scheme using a distance between antennas.

Antenna IC is the simplest IC implementation scheme from among all IC schemes. FIG. 12 is a diagram illustrating an exemplary antenna IC scheme using a distance between antennas and FIG. 13 is a diagram illustrating an exemplary antenna IC scheme using a phase converter.

Referring to FIG. 12, one UE may perform IC using three antennas. In this case, two antennas are used as transmission antennas Tx and one antenna is used as a reception antenna Rx. The two transmission antennas are installed at intervals of a predetermined distance corresponding to about a half wavelength (wavelength/2) based on the reception antenna. This allows a signal transmitted from each transmission antenna to be received as a phase-inverted signal from the viewpoint of the reception antenna. Accordingly, an interference signal from among signals received by the reception antenna converges towards 0.

Figure 13:
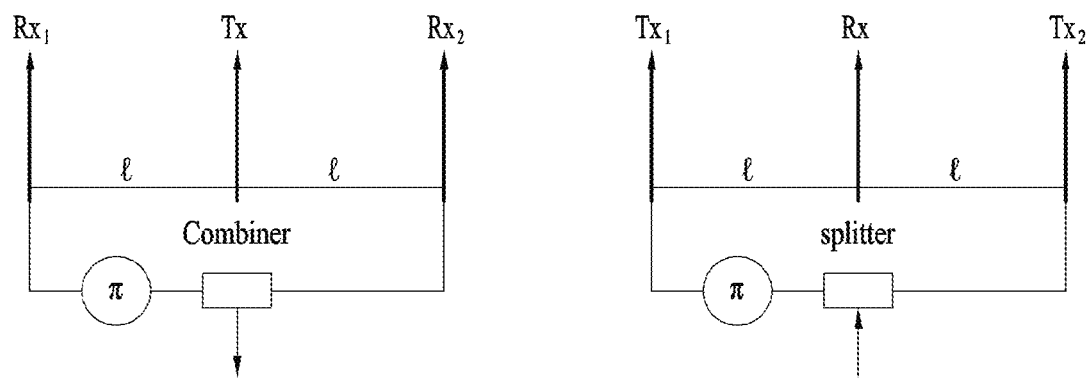
FIG. 13 is a diagram illustrating an exemplary antenna IC scheme using a phase converter.

Referring to FIG. 13, an interference signal may be cancelled using a phase shifter for inverting a phase of the second transmission antenna Tx2 in the same antenna configuration as in FIG. 12. The left drawing of FIG. 13 illustrates antenna deployment for cancelling self-interference using two reception antennas and the right drawing of FIG. 13 illustrates antenna deployment for cancelling interference using two transmission antennas.

Figure 14:
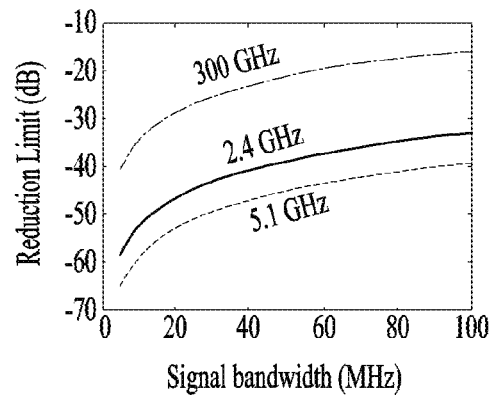
FIG. 14 illustrates IC performance according to bandwidth and center frequency of a signal when an antenna IC scheme is used.

The above antenna IC scheme is affected by bandwidth and center frequency of a transmission signal. That is, as the bandwidth of the transmission signal decreases and as the center frequency of the transmission signal increases, IC performance increases. FIG. 14 illustrates IC performance according to bandwidth and center frequency of a signal when an antenna IC scheme is used.

3.1.2 ADC IC

Even though an interference signal is known to a transmitter, the biggest reason why interference cannot be cancelled is an ADC. Therefore, interference can be cancelled by maximizing ADC performance. However, ADC IC has a difficulty in actual implementation due to limitation of quantization bits of the ADC. Since ADC performance has been gradually improved in recent times, required self-interference cancellation performance may be reduced.

3.1.3 Analog IC

Analog IC is a scheme of cancelling interference prior to ADC IC and cancels self-interference using an analog signal. Analog IC may be performed in an RF region or an Intermediate Frequency (IF) region. The analog IC scheme is performed in a manner of subtracting an interference signal from a signal received by a reception antenna by delaying phase and time of a transmitted analog signal.

The above analog IC scheme has an advantage of requiring only one transmission antenna and only one reception antenna as opposed to the number of antennas in the antenna IC scheme. However, since processing using an analog signal is performed, additional distortion may occur due to implementation complexity and circuit characteristics and thus IC performance may be remarkably changed.

3.1.4 Digital IC (Baseband IC)

Digital IC is a scheme for cancelling interference after ADC IC and includes all IC schemes performed in a baseband region. Digital IC may be performed in a manner of subtracting a transmitted digital signal from a received digital signal.

Alternatively, a UE or an eNB that transmits a signal using multiple antennas may perform beamforming or precoding so that a transmission signal may not be received by a reception antenna. If such schemes are performed on a baseband, the schemes may be categorized as digital IC.

However, digital IC can be performed when a digitally modulated signal is quantized in such a manner of being capable of restoring information about a desired signal. In order to perform digital IC, a magnitude difference in power between an interference signal and the desired signal should be within an ADC range after interference is cancelled using one or more of the IC schemes described in sections 3.1.1 to 3.1.3.

Figure 15:
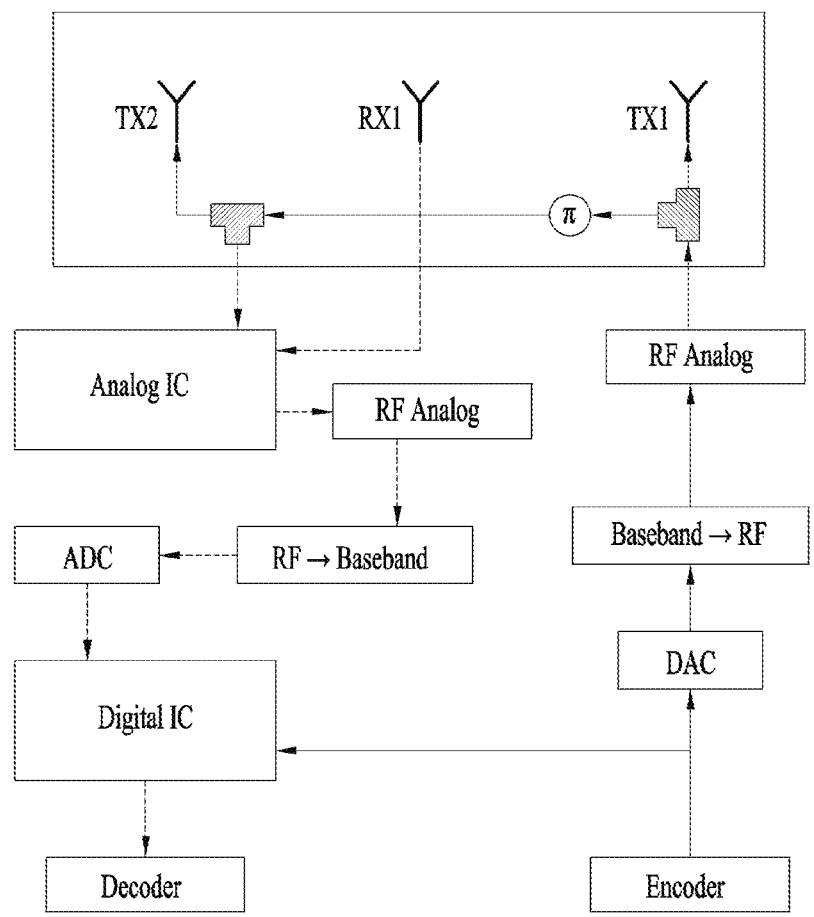
FIG. 15 illustrates a system to which various IC schemes are simultaneously applied.

FIG. 15 illustrates a system to which the IC schemes described in sections 3.1.1 to 3.1.4 are simultaneously applied. Overall IC performance may be improved as IC schemes of respective regions are added.

3.2 IC in MIMO System

An FDR system has been considered in a Single Input Single Output (SISO) scheme because complexity of Self-Interference Cancelation (SIC) remarkably increases in proportion to the number of reception antennas and transmission antennas. For example, in order to introduce FDR in a MIMO system (Nt×Nr) using N transmission antennas Nt and N reception antennas Nr, signals generated from the transmission antennas should be independently cancelled by the respective reception antennas so that a total of (Nt×Nr) SIC blocks is needed.

In this case, an SIC block may be an analog interference canceller for cancelling an analog signal or an RF signal or may be a digital interference canceller for cancelling a digital baseband signal. Alternatively, the SIC block may be an analog-to-digital interference canceller, which is a combination of the analog interference canceller and the digital interference canceller.

Accordingly, the number of SIC blocks in the MIMO system geometrically increases as the number of antennas increases.

For example, a conventional SISO system may cancel self-interference using one SIC block, whereas a 3×3 MIMO system requires a total of 9 SIC blocks to apply FDR.

In this way, many SIC blocks are needed to apply FDR to the MIMO system, which may increase hardware complexity of a UE. In addition, since SIC blocks should perform an adaptation procedure with respect to the UE, an adaptation time may increase or a training duration or signal necessary for performing the adaptation procedure may increase. Furthermore, UE performance may be degraded due to an inaccurate adaptation procedure.

3.3 FDR channel characteristics

For FDR operation in a wireless access system, a transmitter and a receiver need to correctly estimate a self-interference (SI) channel since SI cannot be correctly cancelled when an SI channel estimation error is generated and a desired signal of the transmitter and the receiver cannot be properly restored due to an interference signal transmitted with higher power than the desired signal. Accordingly, the present invention proposes methods by which the transmitter and the receiver can correctly estimate an SI channel to properly restore a desired signal, define a new RS for reducing resource overhead and estimate the SI channel using the new RS.

An SI channel has the following characteristics distinguished from a radio channel between an eNB and a UE, a radio channel between eNBs or a radio channel between UEs.

(1) Semi-static channel

The SI channel refers to an interference channel between a transmit antenna and a receive antenna used in one eNB or one UE (refer to FIG. 8), and thus it can be considered that there is little variation in the channel between the transmit antenna and the receive antenna. That is, while environmental variation is generated due to movement of a UE or time variation is generated due to environmental change between a transmitter and a receiver in the case of a conventional radio channel, environmental variation in the SI channel may be considered to barely occur since the positions of a transmit antenna and a receive antenna of one device rarely change in the case of the SI channel. Accordingly, the SI channel can be considered to be a semi-static channel having little variation over time.

(2) 1-tap channel

A channel between a transmit antenna and a receive antenna used in one eNB or UE is shorter than a conventional radio channel and can be considered to be a line of sight (LOS) channel having no obstacle between the transmit antenna and the receive antenna except in special cases. Due to such characteristics, the SI channel can be assumed to be a channel free from multipath propagation and, even if the SI channel has multipath propagation, the SI channel can be received with much lower power than an LOS tap securing a short range. Accordingly, the SI channel can be regarded as an LOS channel and a 1-tap channel free from multipath propagation.

Embodiments of the present invention will be described on the assumption that the SI channel has characteristics similar to the aforementioned semi-static characteristic and 1-tap channel characteristic. However, the embodiments of the present invention are not limited to the semi-static characteristic and 1-tap channel characteristic and can be applied to wireless environments having RMS delay or maximum delay less than general multipath channels.

4. SI channel estimation method 4.1 New reference signals for SI channel estimation Embodiments of the present invention propose new reference signals for SI channel estimation in an FDR system. Such reference signals are defined as self-interference reference signals (SI-RSs).

Figure 16:
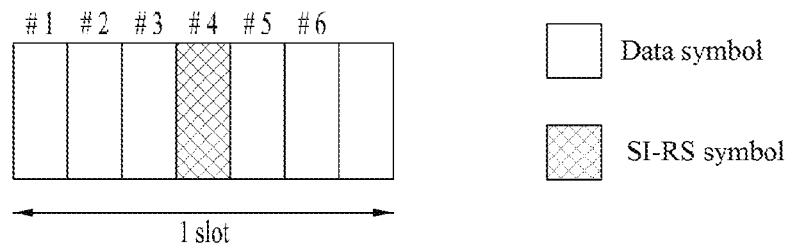
FIG. 16 illustrates a method for configuring an SI-RS for channel estimation.
Figure 17:
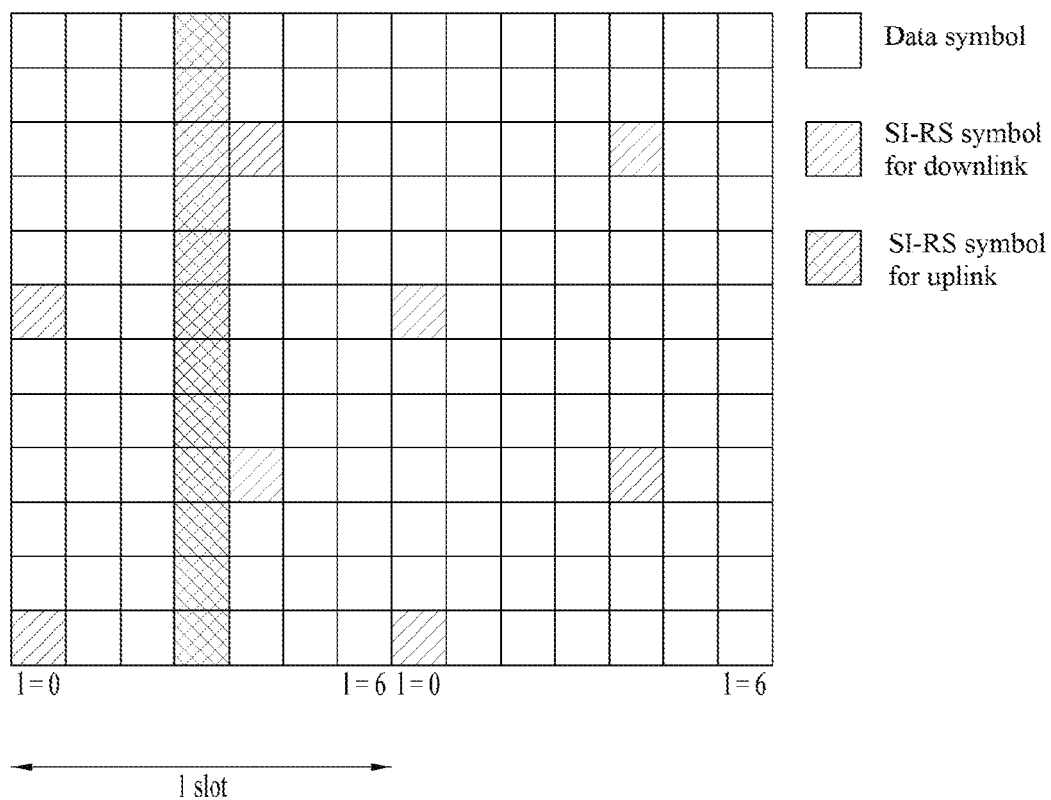
FIG. 17 illustrates another method for configuring an SI-RS for channel estimation.

A DL SI-RS transmitted by an eNB for SI channel estimation and DL transmission, and a UL SI-RS transmitted by a UE for SI channel estimation and UL transmission may be configured as illustrated in FIG. 16 or 17.

FIG. 16 illustrates a method for configuring an SI-RS for SI channel estimation.

Referring to FIG. 16, an SI-RS can be configured and transmitted/received in the full system bandwidth of the fourth OFDM symbol in one slot. That is, a DL SI-RS transmitted by an eNB and UL SI-RSs transmitted by UEs can overlap and be transmitted/received in the same time and frequency domains in the corresponding RS symbols. FIG. 16 shows a case in which one OFDM symbol of one slot is used as an SI-RS symbol. However, two or more OFDM symbols in one slot may be used as SI-RS symbols in consideration of coherence time.

The method illustrated in FIG. 16 is based on the slot structure of LTE/LTE-A, described with reference to FIGS.

3 to 5. Accordingly, when a frame structure in an FDR system differs from the structures shown in FIGS. 3 to 5, the RS symbol allocation position can be changed to a position for achieving most efficient channel estimation.

In the case of the structure as shown in FIG. 16, it is possible to reduce resource waste and to enable efficient channel estimation by matching a resource region to which the UL SI-RS transmitted by the UE is allocated to a resource region to which the DL SI-RS transmitted by the eNB is allocated according to FDR system characteristics.

FIG. 17 illustrates another method for configuring an SI-RS for SI channel estimation.

FIG. 16 shows a case in which a UL SI-RS structure and a DL SI-RS structure for SI channel estimation are identical. Alternatively, a DL RS transmission structure and a UL RS transmission structure may be differently configured.

Referring to FIG. 17, SI-RSs may be allocated in a lattice structure for DL as in 3GPP LTE 8/9/10/11, whereas SI-RSs may be configured using the entire system bandwidth of a specific OFDM symbol for UL. That is, the eNB can allocate DL SI-RSs in a lattice structure in a specific subframe and allocate SI-RS symbols for UL, as shown in FIG. 16, for SI channel estimation.

FIG. 17 illustrates an example in which DL SI-RSs and UL SI-RSs are configured in different structures. Particularly, FIG. 17 shows an example in which UL SI-RS symbols for SI channel estimation are configured using the fourth OFDM symbol of the first slot. Here, the SI-RS symbols for SI estimation may be sparsely transmitted in the time domain using semi-static characteristics of the SI channel. In addition, the SI-RSs shown in FIG. 17 may be transmitted through specific OFDM symbols in a specific slot of an arbitrary subframe, differently from the configuration shown in FIG. 17.

Resource allocation information indicating positions to which SI-RS symbols for SI channel estimation are allocated, shown in FIGS. 16 and 17, may be fixedly defined as a system parameter predefined between a UE and an eNB, or semi-statically allocated through higher layer signaling or dynamically transmitted through a control channel to the UE.

Distinguished from the SI-RS structures shown in FIGS. 16 and 17, UL SI-RSs may be allocated to a specific bandwidth only rather than being allocated to the entire system bandwidth of a specific OFDM symbol on the assumption that fading characteristics in the frequency domain are flat if the SI channel is similar to 1 tap.

Accordingly, SI-RSs for SI channel estimation may be transmitted in a specific system bandwidth and positions to which the SI-RSs are allocated may be defined as a predefined system parameter, transmitted through higher layer signaling or dynamically allocated through a control channel. For example, when SI-RSs are transmitted in a specific system bandwidth only, the SI-RSs can be configured using consecutive frequencies or subcarriers. Alternatively, the SI-RSs may be configured to have a specific rule and to be transmitted through a specific subcarrier only.

In this case, to maintain orthogonality between UL SI-RSs and DL SI-RSs, the UL SI-RSs can also be designed to have the same structure as the SI-RS transmission structure for SI channel estimation.

4.2 SI-RS configuration method

A description will be given of methods for configuring an SI-RS. In embodiments of the present invention, the SI-RS is described by using an RS sequence (refer to TS 36.211 v11.3, 5.5) of LTE/LTE-A. However, this is only exemplary and the SI-RS may be configured using a sequence having high autocorrelation.

An RS sequence $r_{u,v}^{(\alpha)}(n)$ is defined by a cyclic shift $\alpha$ of a basic sequence $\bar{r}_{u,v}(n)$ as represented by Equation 1.

$$r_{u,v}^{(\alpha)}(n) = e^{j\alpha n}\bar{r}_{u,v}(n), \quad 0 \leq n < M_{sc}^{RS} \quad \text{[Equation 1]}$$

Here, $M_{sc}^{RS} = mN_{sc}^{RB}$ indicates the length of an RS sequence and m is a value that satisfies $1 \leq m \leq N_{RB}^{max,UL}$. Multiple RS sequences are defined using different values of $\alpha$ from a single basic sequence.

Basic sequences $\bar{r}_{u,v}(n)$ are divided into groups. Here, $u \in \{0, 1, \ldots, 29\}$ indicates group numbers and v represents a basic sequence number in a corresponding group. Accordingly, each group includes one basic sequence (v=0) having $M_{sc}^{RS} = mN_{sc}^{RB}$ wherein $1 \leq m \leq 5$ and two basic sequences (v=0,1) having $M_{sc}^{RS} = mN_{sc}^{RB}$ wherein $6 \leq m \leq N_{RB}^{max,UL}$. The sequence group number u and the basic sequence number v in a corresponding group can be changed as defined in sections 5.5.1.3 and 5.5.1.4 of TS 36.211 v11. Definition of base sequences $\bar{r}_{u,v}(0), \ldots, \bar{r}_{u,v}(M_{sc}^{RS}-1)$ conforms to the sequence length $M_{sc}^{RS}$.

In embodiments of the present invention, $\bar{r}_{u,v}(n)$ may be an arbitrary sequence. Particularly, the embodiments of the present invention are described using a Zadoff-Chu sequence such that a cyclic shift can be used. $\bar{r}_{u,v}(n)$ can be configured as follows.

When $M_{sc}^{RS} \geq 3N_{sc}^{RB}$, basic sequences $\bar{r}_{u,v}(0), \ldots, \bar{r}_{u,v}(M_{sc}^{RS}-1)$ are given as represented by Equation 2.

$$\bar{r}_{u,v}(n) = x_q(n \bmod N_{ZC}^{RS}), \quad 0 \leq n < M_{sc}^{RS} \quad \text{[Equation 2]}$$

Here, a $q^{th}$ root Zadoff-Chu sequence is defined as represented by Equation 3.

$$x_q(m) = e^{-j\frac{\pi q m(m+1)}{N_{ZC}^{RS}}}, \quad 0 \leq m \leq N_{ZC}^{RS} - 1 \quad \text{[Equation 3]}$$

Here, q is given as represented by Equation 4.

$$q = \lfloor \bar{q} + 1/2 \rfloor + v \cdot (-1)^{\lfloor 2\bar{q} \rfloor}$$

$$\bar{q} = N_{ZC}^{RS} \cdot (u+1)/31 \quad \text{[Equation 4]}$$

Here, the Zadoff-Chu sequence length $N_{ZC}^{RS}$ is defined by the largest decimal that satisfies $N_{ZC}^{RS} < M_{sc}^{RS}$.

When UEs transmit the SI-RS sequences generated as above, a cyclic shift value $\alpha_\lambda$ is defined as represented by Equation 5.

$$\alpha_\lambda 2\pi n_k/M, \quad n_k = 0, 1, \ldots, M-1 \quad \text{[Equation 5]}$$

In Equation 5, a value M for determining the cyclic shift value can be determined by the number of maximum delay tap values included in one OFDM symbol duration using delay profile characteristics of the SI channel. That is, the value M can be defined as represented by Equation 6 or 7.

$$M = \frac{OFDM \text{ symbol duration}}{\text{Channel maximum delay}} \quad \text{[Equation 6]}$$

$$M = \frac{OFDM \text{ symbol duration}}{\text{Channel maximum delay}} + \varepsilon \quad \text{[Equation 7]}$$

That is, the value M is defined by a value obtained by dividing the OFDM symbol duration by a maximum delay value of the SI channel according to Equation 6. Equation 7 considers a margin in the OFDM symbol duration. Here, $\varepsilon$ refers to an arbitrary constant. As defined in Equations 6 and 7, the value M is determined by values defined in the system and thus M is an arbitrary constant.

Accordingly, the cyclic shift value $\alpha_\lambda$ in Equation 5 is determined by a cyclic shift variable $n_k$. The cyclic shift variable $n_k$ can be transmitted to UEs per TTI (Transmit Time Interval; e.g., subframe) as a dynamic indication method. The cyclic shift variable $n_k$ can be transmitted through DCI formats included in a PDCCH signal or an E-PDCCH signal in LTE/LTE-A.

Alternatively, as a semi-static method, an SI-RS may be configured using the same cyclic shift variable $n_k$ for a predetermined number of TTIs. To this end, an eNB can signal the cyclic shift variable $n_k$ to UEs through higher layer signaling (e.g., a MAC signal or an RRC signal).

4.3 Methods for setting cyclic shift variable $n_k$

A description will be given of methods for setting cyclic shift variables applied to SI-RSs used for SI channel estimation. Embodiments of the present invention describe methods for setting cyclic shift variables such that cyclic shift variables used for a DL SI-RS transmitted by an eNB and a UL SI-RS transmitted by a UE do not correspond to each other.

To this end, as a most efficient method, one of cyclic shift variables can be fixedly allocated for the DL SI-RS and the remaining values 1~(M−1) can be assigned for the UL SI-RS. For example, $n_k=0$ can be fixed as a cyclic shift value for the DL SI-RS transmitted by the eNB and the remaining values can be assigned to the UE. That is, the SI-RS transmitted by the eNB is not cyclically shifted and only the SI-RS transmitted by the UE is cyclically shifted.

However, integer values other than $n_k=0$ can be fixedly used as a system parameter for the DL SI-RS for channel estimation performance enhancement. Here, the cyclic shift variable $n_k$ can be calculated by Equation 8.

$$n_k = \begin{cases} (M-1)/2 & \text{if } M \text{ is odd} \\ \frac{M}{2} \text{ or } (M-2)/2 & \text{if } M \text{ is even} \end{cases} \quad \text{[Equation 8]}$$

4.4 SI channel estimation methods

A description will be given of methods for estimating an SI channel in an FDR system using the aforementioned methods.

Figure 18:
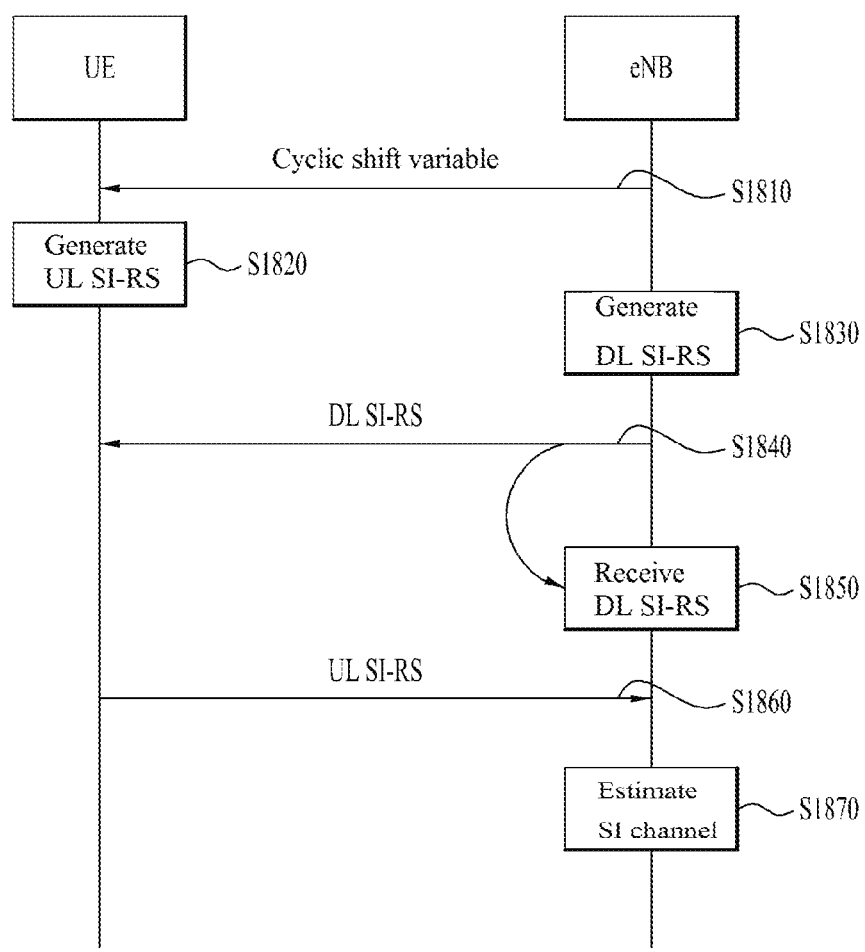
FIG. 18 illustrates a method for transmitting a reference signal for SI channel estimation by an eNB.

FIG. 18 illustrates a method for transmitting an RS for estimating an SI channel by an eNB.

Referring to FIG. 18, the eNB may signal a cyclic shift variable $n_k$ to a UE. Here, the cyclic shift variable may be directly signaled or indicated in the form of an index (S1810).

The cyclic shift variable may be transmitted through a PDCCH signal/E-PDCCH signal/MAC signal/RRC signal in step S1810.

The UE may generate a UL SI-RS using the received cyclic shift variable. Here, the UL SI-RS may be generated through the methods described in section 4.2 (S1820).

The eNB may generate a DL SI-RS using a cyclic shift variable other than the cyclic shift variable allocated to the UE (S1830).

The SI-RSs generated in S1820 and S1830 may be allocated to resource regions, as described above with reference to FIG. 16 or 17. The eNB transmits the generated SI-RS along with data to the UE (S1840).

The UE and the eNB currently operate in an FDR mode. That is, the UE and the eNB can use the entire bandwidth for UL and DL. Accordingly, the DL SI-RS transmitted by the eNB through a transmit antenna in step S1840 may be received by the eNB through a receive antenna (S1850).

The UE may transmit the UL SI-RS generated in step S1820 to the eNB for SI channel estimation (S1860).

The eNB may estimate an SI channel using the DL/UL SI-RSs received in steps S1850 and S1860 (S1870).

Figure 19:
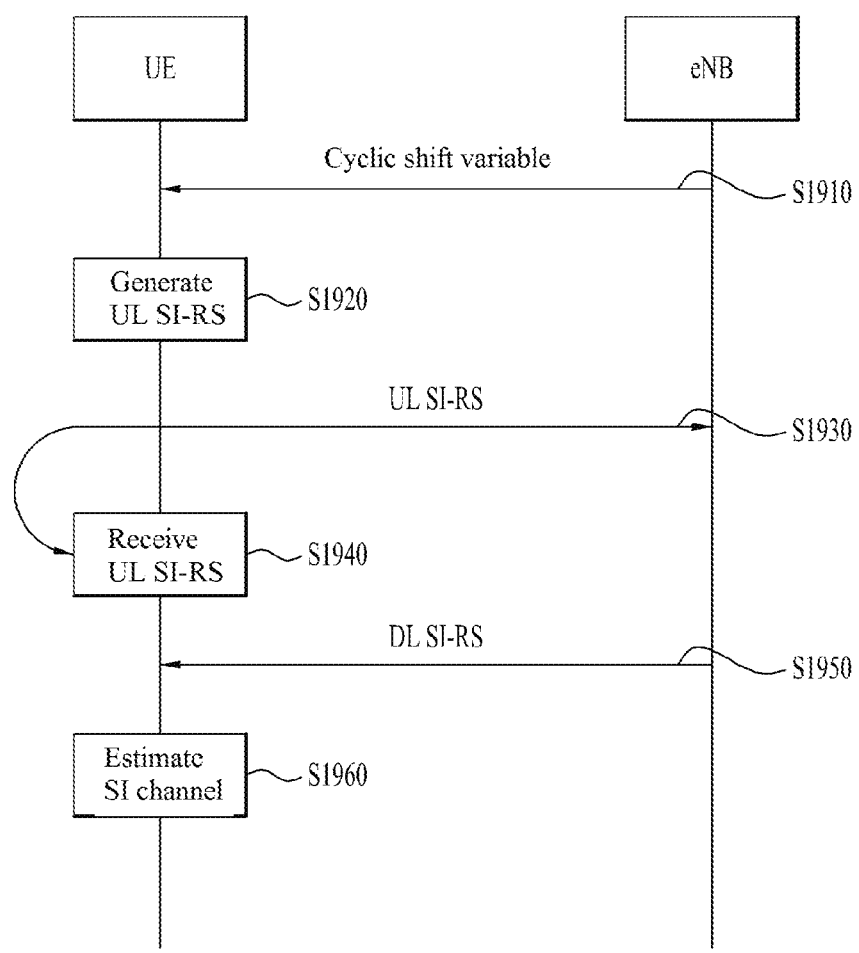
FIG. 19 illustrates a method for transmitting a reference signal for SI channel estimation by a UE.

FIG. 19 illustrates a method for transmitting an RS for estimating an SI channel by a UE.

Referring to FIG. 19, an eNB may signal a cyclic shift variable $n_k$ to the UE. Here, the cyclic shift variable may be directly signaled or indicated in the form of an index (S1910).

In step S1910, the cyclic shift variable may be transmitted through a PDCCH signal/E-PDCCH signal/MAC signal/RRC signal.

The UE may generate a UL SI-RS using the received cyclic shift variable. Here, the UL SI-RS may be generated through the methods described in section 4.2. In addition, the eNB may generate a DL SI-RS using a cyclic shift variable other than the cyclic shift variable allocated to the UE (S1920).

The SI-RSs generated in step S1920 may be allocated to resource regions, as described with reference to FIG. 16 or 17. The UE transmits the generated UL SI-RS along with data to the eNB (S1930).

The UE and the eNB currently operate in the FDR mode. That is, the UE and the eNB can use the entire bandwidth for UL and DL. Accordingly, the UL SI-RS transmitted by the UE through a transmit antenna in step S1930 may be received by the UE through a receive antenna (S1940).

In addition, the eNB may transmit a DL SI-RS, which is generated with a cyclic shift variable other than the cyclic shift variable allocated to the UE, to the UE for SI channel estimation (S1950).

The UE may estimate an SI channel using the DL/UL SI-RSs received in steps S1940 and S1950 (S1960).

Figure 20:
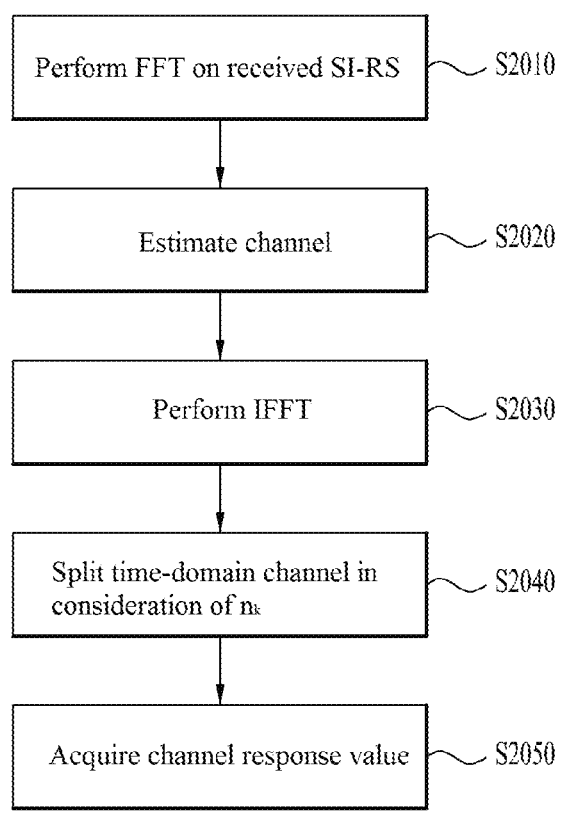
FIG. 20 illustrates a method for respectively estimating SI channels by an eNB and a UE.

FIG. 20 illustrates a method for respectively estimating SI channels by an eNB and a UE.

FIG. 20 illustrates a method for estimating an SI channel, performed in step S1870 of FIGS. 18 and S1960 of FIG. 19.

The eNB or the UE transforms a received SI-RS into a frequency-domain signal by performing FFT (Fast Fourier Transform) thereon. Here, this process can be determined as an OFDM demodulation process since the present invention assumes an OFDM system (S2010).

The eNB or the UE may perform channel estimation using one (e.g., least squares technique) of conventional channel estimation methods based on the frequency-domain signal (S2020).

The eNB or the UE transforms the estimated channel into a time-domain channel by performing IFFT (Inverse-FFT) thereon (S2030).

The eNB or the UE splits the transformed time-domain channel in consideration of a cyclic shift variable $n_k$ allocated per UE (S2040).

In step S2040, the time-domain channel may be split in such a manner that samples of all OFDM symbols are split into the total number M of cyclic shift variables with cyclic shift variables $n_k$ allocated to respective UEs for SI channel estimation.

Figure 21:
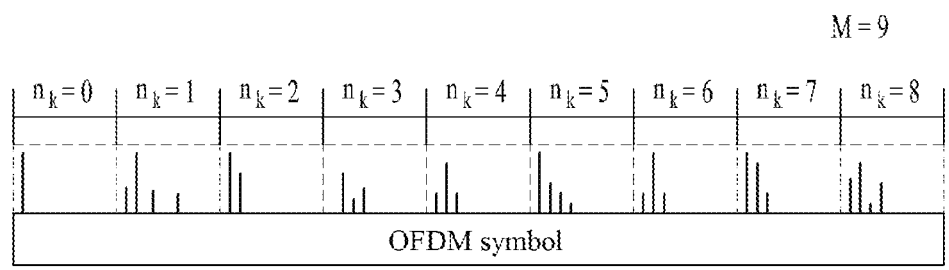
FIG. 21 illustrates SI channel estimation and an exemplary channel response of a time-domain channel split using values $n_k$ allocated to 8 UEs when M=9.

FIG. 21 illustrates SI channel estimation and an exemplary channel response of a time-domain channel split using values $n_k$ allocated to 8 UEs when M=9 in step S2040.

Referring to FIG. 21, $n_k=0$ is a cyclic shift variable fixedly allocated to the eNB and remaining values $n_k=1, 2, \ldots, 8$ are different cyclic shift variables allocated to respective UEs.

Referring back to FIG. 20, the eNB or the UE selects a channel that the eNB or UE desires to acquire in the time-domain channel split in step S2040. Subsequently, the eNB or the UE time-shifts the selected channel and then nulls the remaining region. Then, the eNB or the UE performs FFT to obtain a channel response value with respect to the corresponding SI channel (S2050).

Figure 22:
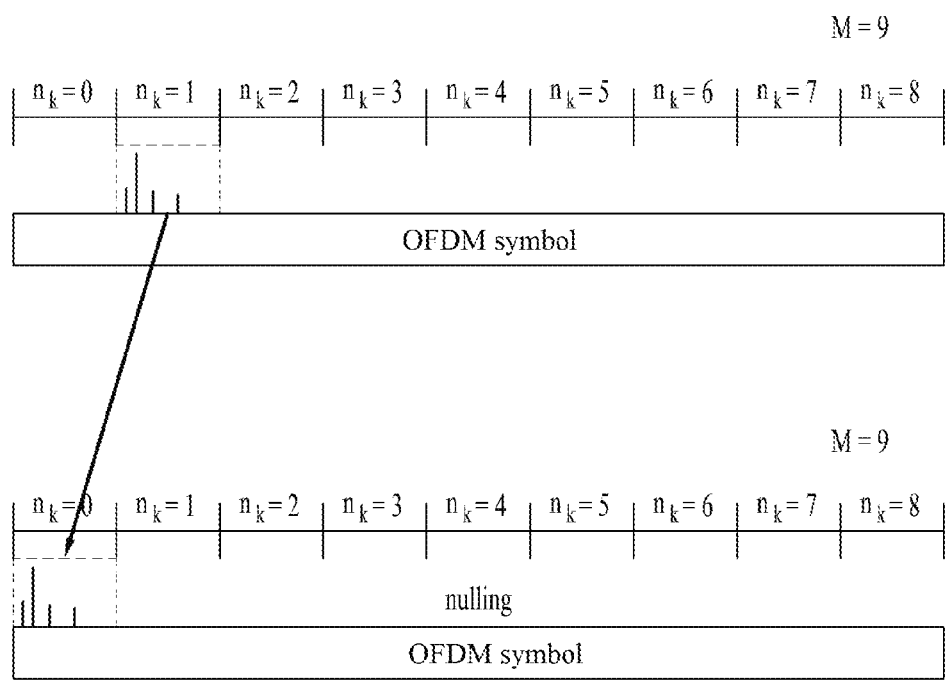
FIG. 22 illustrates a process of acquiring a channel response to a UE to which $n_k$=1 is allocated.

FIG. 22 illustrates a process of obtaining a channel response for a UE to which $n_k=1$ is allocated in step S2050.

Referring to FIG. 22, the eNB attempts to obtain a channel response for the UE to which $n_k=1$ is allocated. Here, the eNB shifts a time-domain channel corresponding to $n_k=1$ to a channel corresponding to $n_k=0$ through time shift. Subsequently, the eNB nulls the remaining channel region and then performs FFT on corresponding OFDM symbols. In this manner, the eNB can obtain a frequency channel response for the UE to which $n_k=1$ is allocated. The UE can also obtain a specific frequency channel response using the method described with reference to FIG. 22.

Referring back to FIG. 20, the eNB or the UE may estimate an SI channel by performing steps S2010 to S2050 using the received SI-RS and cyclic shift variable. That is, the eNB or the UE can cancel the SI channel by estimating the SI channel in the FDR system. Accordingly, data quality can be guaranteed in the FDR system.

5. Apparatuses

Apparatuses illustrated in FIG. 23 are means that can implement the methods described before with reference to FIGS. 1 to 22.

A UE may act as a transmission end on UL and as a reception end on DL. An eNB may act as a reception end on UL and as a transmission end on DL.

That is, each of the UE and the eNB may include a transmitter (Tx) 2340 or 2350, and a receiver (Rx) 2350 or 2370, for controlling transmission and reception of information, data, and/or messages, and an antenna 2300 or 2310 for transmitting and receiving information, data, and/or messages.

Although the transmitter and the receiver are illustrated in FIG. 23 as sharing the antenna, separate antennas may be installed in the transmitter and the receiver as illustrated in FIG. 8. In addition, although one antenna is illustrated in each of the UE and the eNB, two or more antennas may be installed in each of the UE and the eNB.

Each of the UE and the eNB may further include a processor 2320 or 2330 for implementing the afore-described embodiments of the present invention and a memory 2380 or 2390 for temporarily or permanently storing operations of the processor 2320 or 2330.

Embodiments of the present invention can be performed using the components and functions of the aforementioned UE and eNB. For example, the processor of the eNB or the UE can generate, transmit and receive an SI-RS by combining the methods described on sections 1 to 4 for estimating SI channel used in the FDR system. In addition, the processor of the eNB or the UE can estimate an SI channel using the received SI-RS. Refer to section 4 for details.

The Transmitter and the Receiver of the UE and the eNB may perform a packet modulation/demodulation function for data transmission, a high-speed packet channel coding function, OFDMA packet scheduling, TDD packet scheduling, and/or channelization. Each of the UE and the eNB of FIG. 23 may further include a low-power Radio Frequency (RF)/Intermediate Frequency (IF) module. In this case, the Transmitter and the Receiver may be called a transmitter and a receiver, respectively. If the Transmitter and the Receiver are used together, they may be called a transceiver.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present invention may be implemented in the form of a module, a procedure, a function, etc. performing the above-described functions or operations. A software code may be stored in the memory 2380 or 2390 and executed by the processor 2340 or 2330. The memory is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

Embodiments of the present invention are applicable to various wireless access systems including a 3GPP system, a 3GPP2 system, and/or an IEEE 802.xx system. In addition to these wireless access systems, the embodiments of the present invention are applicable to all technical fields in which the wireless access systems find their applications.

What is claimed is:

1. A method for estimating a self-interference (SI) channel in a wireless access system supporting full duplex radio (FDR) communication, the method performed by an evolved Node-B (eNB) and the method comprising:
- transmitting a channel signal including a first cyclic shift variable allocated to a user equipment (UE);
- transmitting a downlink (DL) self-interference reference signal (SI-RS) for estimating the SI channel, generated on the basis of a second cyclic shift variable;
- receiving the DL SI-RS;
- receiving an uplink (UL) SI-RS generated on the basis of the first cyclic shift variable; and
- estimating the SI channel using the DL SI-RS and the UL SI-RS.

2. The method according to claim 1, wherein the second cyclic shift variable is a fixed value in the system, and the first cyclic shift variable is a value per UE.

3. The method according to claim 1, wherein the DL SI-RS and the UL SI-RS are transmitted through a same resource region in a specific subframe.

4. The method according to claim 1, wherein the DL SI-RS and the UL SI-RS are transmitted through different resource regions in a specific subframe.

5. The method according to claim 1, wherein the estimating of the SI channel is performed in consideration of one or more of a total number of cyclic shift variables, the first cyclic shift variable and the second cyclic shift variable.

6. A method for estimating, by a UE, an SI channel in a wireless access system supporting FDR communication, the method comprising:
- receiving a channel signal including a first cyclic shift variable allocated to the UE;
- transmitting a UL SI-RS generated on the basis of the first cyclic shift variable;
- receiving the UL SI-RS;
- receiving a DL SI-RS generated on the basis of a second cyclic shift variable; and
- estimating the SI channel using the DL SI-RS and the UL SI-RS.

7. The method according to claim 6, wherein the second cyclic shift variable is a fixed value in the system, and the first cyclic shift variable is a value per UE.

8. The method according to claim 6, wherein the DL SI-RS and the UL SI-RS are transmitted through a same resource region in a specific subframe.

9. The method according to claim 6, wherein the DL SI-RS and the UL SI-RS are transmitted through different resource regions in a specific subframe.

10. The method according to claim 6, wherein the estimating of the SI channel is performed in consideration of one or more of a total number of cyclic shift variables, the first cyclic shift variable and the second cyclic shift variable.

11. An eNB for estimating an SI channel in a wireless access system supporting FDR communication, the eNB comprising:
- a transmitter;
- a receiver; and
- a processor configured to estimate in connection with the transmitter and the receiver,
- wherein the processor is configured to:
- control the transmitter to transmit a channel signal including a first cyclic shift variable allocated to a UE and to transmit a DL SI-RS for estimating the SI channel, generated on the basis of a second cyclic shift variable;
- control the receiver to receive the DL SI-RS and to receive a UL SI-RS generated on the basis of the first cyclic shift variable; and
- estimate the SI channel using the DL SI-RS and the UL SI-RS.

12. The eNB according to claim 11, wherein the second cyclic shift variable is a fixed value in the system, and the first cyclic shift variable is a value per UE.

13. The eNB according to claim 11, wherein the DL SI-RS and the UL SI-RS are transmitted through a same resource region in a specific subframe.

14. The eNB according to claim 11, wherein the DL SI-RS and the UL SI-RS are transmitted through different resource regions in a specific subframe.

15. The eNB according to claim 11, wherein the SI channel is estimated in consideration of one or more of a total number of cyclic shift variables, the first cyclic shift variable and the second cyclic shift variable.

* * * * *